United States Patent
Thomas et al.

(10) Patent No.: US 9,742,819 B2
(45) Date of Patent: Aug. 22, 2017

(54) SYSTEM AND METHOD FOR RELIABLE MESSAGING BETWEEN APPLICATION SESSIONS ACROSS VOLATILE NETWORKING CONDITIONS

(71) Applicants: Monroe M. Thomas, Toronto (CA); David McFadzean, Toronto (CA); Lachlan Holmes, Toronto (CA)

(72) Inventors: Monroe M. Thomas, Toronto (CA); David McFadzean, Toronto (CA); Lachlan Holmes, Toronto (CA)

(73) Assignee: SYNAPTIVE MEDICAL (BARBADOS) INC., Bridgetown (BB)

( * ) Notice: Subject to any disclaimer, the term of this patent is extended or adjusted under 35 U.S.C. 154(b) by 0 days.

(21) Appl. No.: 14/776,482

(22) PCT Filed: Mar. 14, 2014

(86) PCT No.: PCT/CA2014/050256
§ 371 (c)(1),
(2) Date: Sep. 14, 2015

(87) PCT Pub. No.: WO2014/139009
PCT Pub. Date: Sep. 18, 2014

(65) Prior Publication Data
US 2016/0044069 A1  Feb. 11, 2016

Related U.S. Application Data

(60) Provisional application No. 61/798,103, filed on Mar. 15, 2013.

(51) Int. Cl.
*H04L 29/06* (2006.01)
*H04L 12/939* (2013.01)
*H04L 12/58* (2006.01)

(52) U.S. Cl.
CPC ........ *H04L 65/1083* (2013.01); *H04L 49/552* (2013.01); *H04L 51/30* (2013.01); *H04L 51/34* (2013.01); *H04L 51/38* (2013.01)

(58) Field of Classification Search
CPC ................. H04L 65/1083; H04L 49/552
(Continued)

(56) References Cited

U.S. PATENT DOCUMENTS 6,381,241 B1    4/2002  Ghirnikar
7,689,710 B2 *  3/2010  Tang .............. H04L 29/06
                                              709/222
(Continued)

FOREIGN PATENT DOCUMENTS

CN      101267440 A    9/2008
EP        1326388 A2    7/2003
(Continued)

OTHER PUBLICATIONS

International Search Report and Written Opinion; PCT/CA2015/050256; Jun. 9, 2014.
(Continued)

*Primary Examiner* — Suraj Joshi
(74) *Attorney, Agent, or Firm* — Ridout & Maybee LLP

(57) ABSTRACT

An electronic device is provided comprising a processor, a memory coupled to the processor, and a communications module saved in the memory and an application saved in the memory. The communications module configures the processor to generate a first transmission sequence number associated with a transport message to be sent to a remote device, include the first transmission sequence number in the transport message, and send the transport message to the remote device.

19 Claims, 8 Drawing Sheets

(58) Field of Classification Search
 USPC .......................................................... 709/228
 See application file for complete search history.

(56) References Cited

U.S. PATENT DOCUMENTS

| | | | |
|---|---|---|---|
| 7,702,739 B1 | 4/2010 | Cheng et al. | |
| 2004/0205781 A1* | 10/2004 | Hill | G06F 9/546 |
| | | | 719/328 |
| 2005/0223114 A1* | 10/2005 | Hanson | H04L 41/0893 |
| | | | 709/245 |
| 2008/0192696 A1* | 8/2008 | Sachs | H04W 36/02 |
| | | | 370/331 |

FOREIGN PATENT DOCUMENTS

| | | |
|---|---|---|
| EP | 1462941 | 9/2004 |
| EP | 1463249 | 9/2004 |
| EP | 2456259 A2 | 5/2012 |

OTHER PUBLICATIONS

International Preliminary Report on Patentability; PCT/CA2014/050256; Mar. 9, 2015.
Examiner's Report, Application No. 2,905,607, Dated Jul. 15, 2016.
Extended European Search Report, Application No. 14763304.4, Dated Oct. 26, 2016.
Web Services Reliable Messaging Protocol, WS—Reliablemessaging Specification, Mar. 13, 2013.

* cited by examiner

SYSTEM AND METHOD FOR RELIABLE MESSAGING BETWEEN APPLICATION SESSIONS ACROSS VOLATILE NETWORKING CONDITIONS

CROSS REFERENCE TO RELATED APPLICATIONS

The present application claims priority to U.S. Provisional Application No. 61/798,103, filed Mar. 15, 2013, the entirely of which is hereby incorporated by reference.

FIELD

The present disclosure generally relates to communications, and more specifically, to a system and method for reliable messaging between application sessions across volatile networking conditions.

BACKGROUND

In today's mobile-device connected world, people carry their network devices through several different data networks during their daily travels. There are many places and opportunities for devices to connect to the Internet and communicate. From Wi-Fi networks at home, to a 4G or LTE cellular network in cars or on buses, to Wi-Fi hotspots in coffee shops or shopping malls, to secure Wi-Fi corporate networks in offices, or even physical Ethernet connections, devices are continually utilizing various network connections available in several mediums, across wide physical environments. Yet, communications are still inherently unreliable, in the sense that, for example, once you leave a WiFi hot spot, any data transfer in progress terminates.

There remains a need for improved reliability in wireless network communications.

SUMMARY

One aspect of the present description provides an electronic device having a processor, a memory coupled to the processor, and a communications module saved in the memory and an application saved in the memory. The communications module configures the processor to generate a first transmission sequence number associated with a transport message to be sent to a remote device, include the first transmission sequence number in the transport message, and send the transport message to the remote device. The communications module may further configure the processor to receive a second transport message from the remote device, the second transport message including a second transmission sequence number, generate a release sequence number of a next expected transport message to be received from the remote device, and release data contained in the second transport message to the application when the release sequence number equals the second transmission sequence number.

Another aspect of the present description provides a method for reliable communications between an electronic device and a remote device. The method comprises an electronic device generating a first transmission sequence number associated with a transport message to be sent to the remote device, including the first transmission sequence number in the transport message, and sending the transport message to the remote device. The method may further comprise the electronic device receiving a second transport message from the remote device, the second transport message including a second transmission sequence number, generating a release sequence number of a next expected transport message to be received from the remote device, and releasing data contained in the second transport message to an application on the electronic device when the release sequence number equals the second transmission sequence number.

Another aspect of the present description provides a system for reliable communications comprising an electronic device having a processor, a memory coupled to the processor, a communications module saved in the memory and an application saved in the memory. The communications module configures the processor to generate a first transmission sequence number associated with a transport message to be sent to a remote device, include the first transmission sequence number in the transport message, send the transport message to the remote device and add the transport message to an acknowledgement list. The remote device has a processor, a memory coupled to the processor, a communications module saved in the memory and an application saved in the memory. The communications module of the remote device configures the processor to receive the transport message from the electronic device, generate a first release sequence number of a next expected transport message to be received from the electronic device, and release data contained in the transport message to the application of the remote device when the first release sequence number equals the first transmission sequence number.

A further understanding of various aspects of the subject matter can be realized by reference to the following detailed description and drawings.

BRIEF DESCRIPTION OF THE DRAWINGS

In order that the subject matter may be readily understood, embodiments are illustrated by way of examples in the accompanying drawings, in which.

DETAILED DESCRIPTION

Figure 1A:
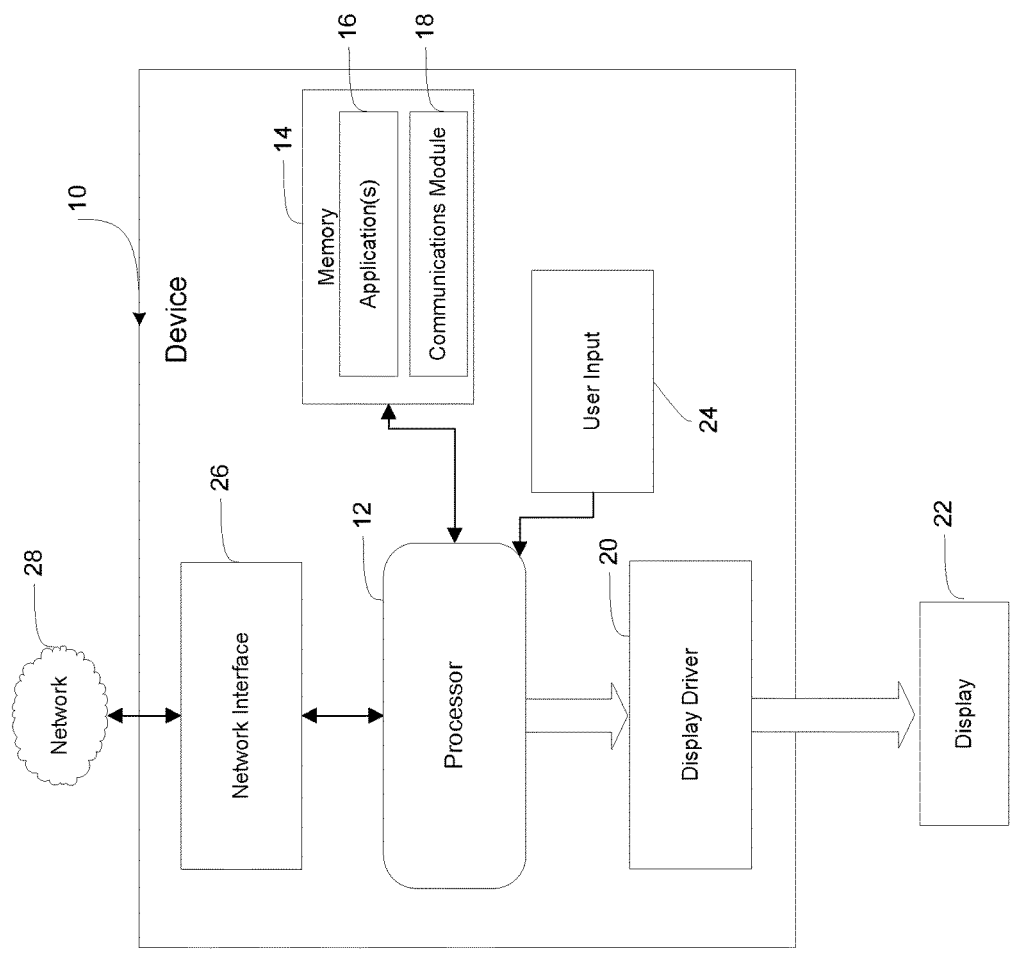
FIG. 1a is a block diagram illustrating an exemplary electronic device.

One difficulty with a device's widespread use of multiple network connections may be the increase in susceptibility to connection loss. A device may lose its connection to the Internet due to a variety of factors including signal loss or switching to a different network provider. Whenever a connection is lost, there can be an impact on any application on the device actively using that connection. For some classes of applications, such as web browsers, the interruption in communication simply means that the user might have to refresh a page. For other classes of applications, the interruption of network service may require restarting the application or retransmitting large volumes of data to resynchronize the state of the application with a remote server, which may be costly in terms of time and metered bandwidth usage.

In general, current network protocols and applications are inadequate to reliably and efficiently maintain the state of a real-time continuous communications session across network disconnections and reconnections. There are presently two common forms of communication used by devices connected to the Internet: a request/response mode of communication and a continuous streaming mode of communication.

In a request/response mode of communication, a short-lived connection tends to be made to a server to request information which is returned by the server in a response over the same connection. With this process of creating a connection, however, the connection may often have a high overhead cost in terms of time. As a result, in some optimizations, an underlying networking agent on the device is needed to minimize this overhead by keeping the connection open in case another request is made. In addition to high time costs, this mode of communication, which has highly structured requests and responses, often has significant overhead in terms of the size of requests and responses needed to encode certain types of information. As a result, this mode may be impractical as it is often inefficient with respect to time and bandwidth.

In a continuous streaming mode of communication, a long-lived connection tends to be made to a server. This can allow the device and the server to continuously exchange information in proprietary ways that minimize the space (e.g., bandwidth) used to transmit information or that facilitate the consumption of the information by applications running on the server or device. The most common issue faced when continuous streaming is used by mobile devices is that the connection may be disrupted by a loss of network service caused by a weak wireless signal or a change in the network that the device is connected to.

The request/response mode of communication is typically conducted using the standard Hyper Text Transfer Protocol (HTTP), the lingua franca of web servers and web browsers. The continuous streaming mode of communication is typically conducted using the standard Transmission Control Protocol (TCP), one of the core Internet protocols.

As the identity of a device connected to the Internet is typically determined by its network address, the temporary loss of network service has different impacts on the two modes of communication previously discussed. For example, as a network address is generally assigned to a device when it connects to a network service provider, when network service is re-established to a device that has temporarily lost network service due to signal loss, the restored network service will likely be from the same provider, in which case the device may, but not necessarily, be reassigned the same network address that the device had before the loss of service. In the case that the device is connected to a new network service provider, the device will almost certainly be assigned a different network address than it had prior to the loss of service.

If a server does not care about the identity of the device making the request, then the change in network address of a device has no effect and the response will be sent to a request regardless of the request's originating network address. If the server requires some kind of authentication, any change in the network address of the device may cause the server to refuse the request until the device has been authenticated at its new address.

For the request/response mode of communications, the loss of a connection will tend to interrupt a request and its subsequent response irreparably. However, the loss of the connection is relatively easy to recover from. There is no attempt made to recover or reuse any partial information which may have been received or been in flight over the network, and the networking agent software on the device simply aborts the request in the application that originated the request. If desired, the application can simply resubmit the request using a new connection, if available.

The HTTP request/response mode provides well-documented protocol elements to facilitate such authentication requirements. For example, HTTP can be layered over top of a continuous streaming communications protocol (e.g., TCP) to provide for a simple recovery mechanism in the case of connection loss and provide mechanisms for authentication of a device's identity. HTTP is, however, incomplete as a facility that permits its direct use as a reliable messaging technology because, although the party that sends a request may eventually know if the request and response messages are respectively sent and received successfully (e.g., by the inherent design of the protocol), there are circumstances under which the party that sends a response can never know for sure whether the response was completely received by the requesting party. In particular, if the underlying network connection fails at some point after queuing of the transmission of the response data to that connection, there is typically no way to know which parts of the response were successfully received or not received. There is no provision within the design of HTTP to retransmit a response. Instead, it is left to the requesting party to resubmit the request and there is no provision within HTTP to identify the request as a duplicate.

For the continuous streaming mode, the loss of a connection is more difficult to recover from. In general, at the level of networking interfaces provided by most operating systems available on servers and devices, there is no way to determine what information was or was not successfully received or sent by the other end of a connection before the connection is closed due to the loss of network service by either side of the connection.

TCP guarantees that sequences of bytes released to an application from the network are in the same order that they were submitted to the network. Alternatively, the User Datagram Protocol (UDP), another core Internet protocol, may also be used to stream information with less overhead than TCP, but there is no guarantee that sequences of bytes will be received in the same order that the sequences of bytes were sent. Additional metadata must be sent with UDP data packets to permit proper sequencing of bytes by the receiving endpoint.

When a connection is re-established between a server and device, any change in the network address of the device means that the server cannot distinguish a connection as originating from a previously connected device, or from an entirely different device. TCP as a continuous streaming communication modality does not define a protocol for authenticating the identity of a device to a server other than the network address, which is clearly insufficient when the network address of a device is volatile.

TCP is a continuous stream communications modality. For the lifetime of a TCP session between two endpoints on a network, TCP will guarantee that byte sequences released to an application from an underlying network service are in the same order that they were submitted by another application. The TCP session may persist over short periods of loss of network service.

However, TCP is incomplete as a facility that permits its direct use as a reliable messaging technology. In particular, a TCP session only lasts as long as the endpoints' network addresses are unchanged. Additionally, TCP internally implements timeouts so that if a network loss persists for too long of a period, the session may be terminated by one or both endpoints. When the TCP session is terminated, there is no way to know which bytes that were recently sent over the connection were successfully received or not received, and there is no provision within TCP to recover the state of a previous session in order to retransmit byte sequences that may not have been sent by the previous session or to detect byte sequences already sent by the previous session. Finally, TCP provides no predefined mechanism to authenticate a device's identity.

The User Datagram Protocol (UDP) does not provide any guarantees regarding whether sequences of bytes sent from one network endpoint may ever arrive at the destination endpoint, or that the sequences of bytes will arrive in the same order that they were sent. Thus, UDP is not a facility that can be directly used as a reliable messaging technology.

Mission critical, real-time, and near real-time applications, for example applications used for medical diagnosis, treatment or procedures, require reliable messaging capabilities. However, existing Internet standard protocols available to many devices and servers do not have all the requirements for reliable messaging. The common protocols available to applications on servers and devices (e.g., HTTP, TCP, and UDP) cannot be directly used for reliable messaging between parties as part of a communications session.

There is therefore a need for a reliable messaging system and method that can be layered on these existing protocols. There is a need for communications sessions exhibiting reliable messaging wherein the identity of both parties in the communication session is known and unchanging.

There is also a need for a reliable messaging system wherein messages are released to an application by a receiving agent in precisely the same order that the messages are sent by a transmitting agent. Further, there is a need for a reliable messaging system wherein messages are not released to an application more than once. That is, if a receiving agent receives an out-of-order message from an underlying network service, the receiving agent may not release the out-of-order message to the application until all prior messages have been released, and the receiving agent may discard any message duplicates received from the network service.

In addition, there is a need for a reliable messaging system that ensures that messages that are submitted by an application to a transmitting agent and sent by that transmitting agent to an underlying network service eventually reach a receiving agent. In this regard, the agent may retransmit the message over the same or a different network service until certainty of its reception by a receiving agent is achieved by some means, or until the communications session is terminated for some reason.

In this respect, the present application may coordinate a reliable communications session between an electronic device and a remote device such that the reliable communications session is indefinitely persistable regardless of states of underlying communications protocols.

Various apparatuses or processes will be described below to provide examples embodiments of the present description. No embodiment described below is intended to limit the claims and the claimed subject matter may encompass processes or apparatuses that differ from those described below. The claimed subject matter is not limited to apparatuses or processes having all of the features of any one apparatus or process described below or to features common to multiple or all of the apparatuses or processes described below. It is possible that an apparatus or process described below is not an embodiment of the claimed subject matter.

Furthermore, numerous specific details are set forth in order to provide a thorough understanding of the embodiments described herein. However, it will be understood by those of ordinary skill in the art that the embodiments described herein may be practised without these specific details. In other instances, well-known methods, procedures and components have not been described in detail so as not to obscure the embodiments described herein.

Also, the description is not to be considered as limiting the scope of the embodiments described herein. Furthermore, in the following passages, different aspects of the embodiments are defined in more detail. Each aspect so defined may be combined with any other aspect or aspects unless clearly indicated to the contrary. In particular, any feature indicated as being preferred or advantageous may be combined with at least one other feature or features indicated as being preferred or advantageous.

The following definitions may be applied to terms employed in the description.

As used herein, the singular forms "a," "an," and "the" include plural references unless the context clearly dictates otherwise. As used herein, the plural forms include singular references unless the context clearly dictates otherwise.

As used herein, a "communications session" is a session between two parties, which are typically applications running on either servers or devices, that may exchange messages with each other over one or more underlying network services during the lifetime of the session, and during which the identity of each party remains immutable. The lifetime of the session may extend beyond the duration of any connection formed through underlying networking services available to both parties.

In one embodiment, there is provided systems and methods for reliably maintaining the state of a real-time continuous communications session across network disconnections and reconnections. The system and methods provided herein may include one or more network electronic device(s), wherein the network electronic device(s) are operable to connect to other network electronic device(s) via communication link(s). Persons of relevant skill will appreciate that electronic device(s) may include a range of network based components including but not limited to mobile devices, tablet computers, smart phones, desktop computers, laptop computers, servers and medical grade computing devices. Each electronic device may be a different type of electronic device.

Communication link(s) may include OC3, T1, Code Division Multiple Access, Global System for Mobile Communications, Global Packet Relay Service, Ethernet, 802.11 and its variants and Bluetooth, for example, although persons of relevant skill will appreciate that other types of network connections, including wired and wireless types, can be used in the systems and methods described herein. The series of communications between two device(s) across communication link(s) may be referred to as a communication session(s).

Referring to FIG. 1a, a block diagram illustrating an exemplary electronic device 10 on which aspects of the present application may be implemented is shown. The electronic device 10 may include a range of network based electronic devices not limited to mobile devices, tablet computers, smart phones, desktop computers, laptop computers, servers, and medical grade electronic devices. The electronic device 10 has a processor 12 and a memory 14. The memory 14 may have stored therein one or more applications 16 and a communications module 18. The processor 12 may be coupled to a display driver 20, which may optionally be connected to a display 22. The electronic device also has user input devices 24, such as a keyboard, mouse, touchpad, or any other suitable input device according to the design criteria of a particular application. The electronic device 10 further has a network interface 26 for interfacing with a network 28. The network interface 26 and network 28 may include any suitable networking technology including the communication links outlined above.

In some embodiments, the electronic device 10 may include the communications module 18 that facilitates the communications session saved in memory 14. In some embodiments, the device 10 may include the application(s) 16 that act as parties (106 of FIG. 1*b*) to communication session(s). An application 16 may be associated with peer(s) (e.g. an electronic device 10) which include transport agent(s) (107 of FIG. 1*b*), for sending transport messages (103 of FIG. 1*b*) to and receiving transport messages (103 of FIG. 1*b*) from other transport agent(s) (107 of FIG. 1*b*) across mutual communication link(s) using appropriate networking protocols. The application(s) 16 may include the communications module 18 or, alternatively the communications module 18 may be separate from applications 16 saved in the memory 14 of the electronic devices 10.

A local peer (e.g. an electronic device 10) may be a peer's conception or representation of itself as the agent of an application, aiming to ensure reliable messaging is a property of a communications session. A remote peer may be a local peer's conception or representation of the agent of the other application participating in the communications session, also aiming to ensure that reliable messaging is a property of a communications session.

Each electronic device 10 in the systems and methods of the present description may include storage component(s) which maintain data about electronic device(s) 10 to which communication link(s) have been established including identity information, communication link(s), peer session states data (300 of FIG. 3) and message transfers. Persons of skill will appreciate that storage components such as the memory 14 may include volatile storage (e.g., random access memory ("RAM")) as well as non-volatile storage (e.g., hard disk drive) or combinations of volatile or non-volatile storage, in a computing environment associated with a device, such as the electronic device 10.

The item(s) maintained by a local peer's (e.g., an electronic device 10) storage component(s) (e.g., the memory 14) may include information associated with the identity of a remote peer (e.g., a remote electronic device 10). During the lifetime of a communications session between two peers, the session state may transition through several states of operation maintained by the storage component(s), including CLOSED, OPEN, CONNECTING, ACTIVE and OFFLINE session states (see FIG. 2). Each peer may include a communication mechanism to publish the session state of the communications session to its associated application(s) 16, which may be recorded by the peer's storage component(s).

Figure 1B:
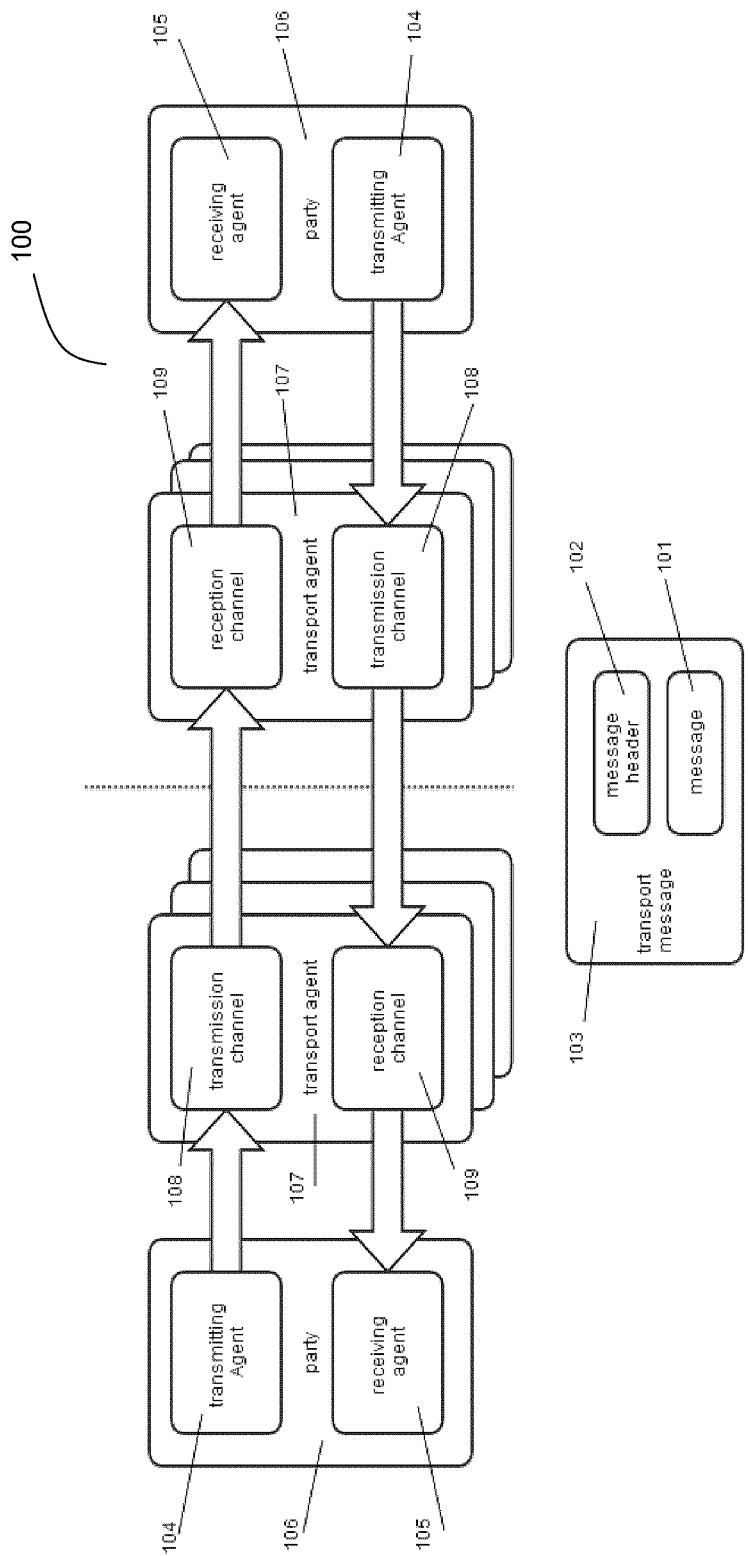
FIG. 1b is a block diagram illustrating an exemplary peer data session.

Referring now to FIG. 1*b*, a block diagram illustrating an exemplary peer data session or communication session 100 is shown. FIG. 1*b* may show the relation between various architectural components contained in a reliable communication system.

Message 101 may be an immutable, finitely-sized sequence of bytes sent from one party 106 in a communications session to another. Message header 102 may be another immutable, finitely-sized sequence of bytes that a transmitting agent 104 may prepend or append to the message 101 that is intended for use and interpretation by a receiving agent 105. A transport message 103 may be the combination of the message 101 and the message header 102 that is sent or received via a network service (e.g., network 28). The message header 102 of the transport message 103 includes the identity of the peer (e.g., peer ID) associated with the transport agent 104. The message header 102 may also distinguish transport message 103 types such as ping and acknowledgement transport messages 103 from other types of transport messages 103. The transport message 103 may further have a body that includes application defined message content. The transport message 103 may further include a transmission sequence number (TSN), which in one example may be part of the message header 102 and may be a sequence number of the transport message 103 assigned by the sending peer at the time the message is given to the transport agent 107 for delivery to the remote peer. The transport message 103 may further include a release sequence number (RSN), which in one example may be part of the message header 102 and may be a sequence number of the last transport message 103 received and released by the local peer to its application (e.g., application 16).

The transmitting agent 104 may be part of a system on a device (e.g, electronic device 10) or server (e.g., electronic device 10) that an application (e.g., application 16) may submit messages to. That is, an application 16 may submit a message 101 to the transmitting agent 104, and rely on the transmitting agent 104 to send the message 101 via an available network service (e.g., network 28) as part of a transport message 103.

The receiving agent 105 may be part of a system on a device (e.g, electronic device 10) or server (e.g., electronic device 10) that an application (e.g., application 16) may receive messages 101 from. That is, the receiving agent 105 may release messages 101 to an application (e.g., application 16), where said messages 101 are received as part of the transport message 103 via an available network service (e.g., network 28).

A party 106 in a communications session may be comprised of both the receiving agent 105 and the transmitting agent 104 connected respectively, by some means, to the transmitting agent 104 and receiving agent 105 of the other party. Reliable messaging is a property of a communications session between the parties 106 such that the eventual transmission and reception of messages between the parties 106 is not visibly affected by changes in the underlying network connections and network addresses of the parties 106 involved in the session.

A transport agent 107 comprises a transmission channel 108 and a reception channel 109. The transport agent 107 can send transport messages 103 to and receive transport messages 103 from another transport agent 107 across a mutual network (e.g., network 28) connection using appropriate networking protocol(s). The transport agent 107 sends and receives whole transport messages 103 in whatever fashion may be appropriate for the protocol.

An application (e.g., application 16) may represent a party 106 in a communications session. A peer (e.g., an electronic device 10) may be considered as an agent for an application in a communications session. A peer may have one or more associated transport agents 107. A peer typically does not send or receive partial transport messages 103 to or from the transport agent 107. A peer may be both a client and a server if the peer has transport agents 107 that can both actively initiate and passively accept connections from other transport agents 107. A peer also tends to be neither a client nor a server if the peer only has transport agents 107 that utilize non-connection oriented protocols such as UDP. Aside from the initiation of an underlying network connection via some connection-oriented network protocol between passive (e.g., server) and active (e.g., client) transport agents 107, the relationship between peers in a communication session may be fully symmetric, so the various methods are only described with respect to the local peer.

A server may be a peer with one or more transport agents that passively accept connections via some network service (e.g., network 28) from other transport agents 107. A client may be a peer with one or more transport agents 107 that actively initiate connections via some network service to other transport agents.

A handshake transport message 103 may be the first transport message 103 sent by a peer after a connection is made between transport agents 107. At a minimum, the handshake transport message 103 contains the identity of the sending peer in its message header 102.

A handshake acceptance transport message 103 may be the first of two possible transport messages 103 sent by a local peer after sending a handshake transport message 103 to a remote peer and receiving a corresponding handshake transport message 103 from the remote peer. The handshake acceptance transport message 103 contains, at a minimum, the identity of the sending peer in its message header 102. A handshake rejection message may be the second of two possible transport messages 103 sent after a handshake transport message 103. The handshake rejection transport message 103 contains, at a minimum, the identity of the sending peer in its message header 102.

Further, acknowledgement and ping transport messages 103 may also be used. An acknowledgment transport message 103 may be a transport message 103 that can be submitted at any time for delivery from one peer to another. Aside from being distinguished as an acknowledgment transport message 103, the acknowledgement transport message 103 may be handled like any other transport message 103 except as noted. A ping transport message 103 may be a transport message 103 that can be submitted at any time for delivery from one peer to another. Aside from being distinguished as a ping transport message 103, the ping transport message 103 may be handled like any other transport message 103 except as noted.

Figure 2:
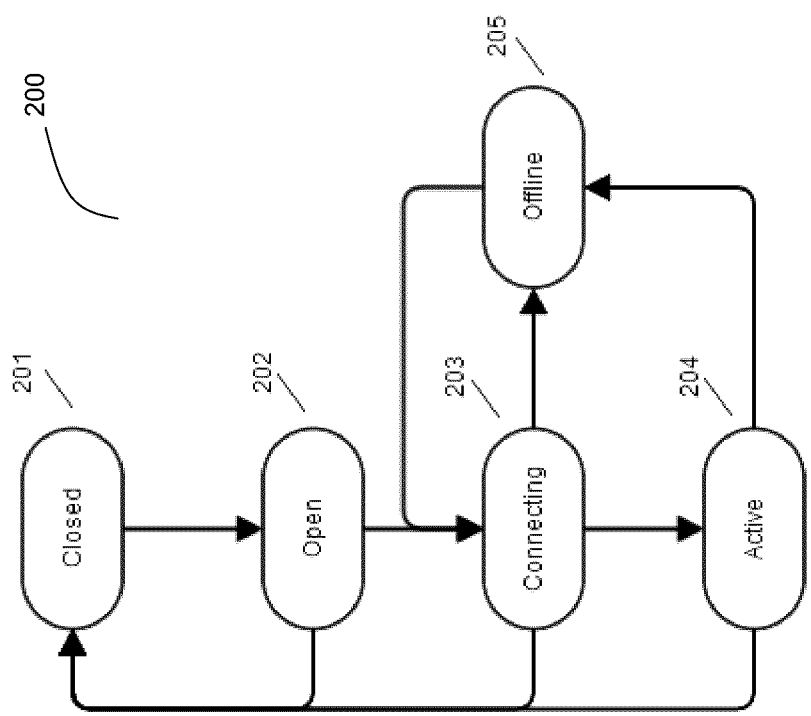
FIG. 2 is a flow chart illustrating a process diagram for connection state transitions.

Referring now to FIG. 2, a flow chart illustrating a method 200 for connection state transitions is shown. In FIG. 2, a CLOSED session state 201 may refer to a communications session between two peers before the first connection is made. In the CLOSED session state 201, there may be no peer session state data (see 300 of FIG. 3) maintained by a local peer with respect to any remote peers except those for which the storage component(s) (e.g., the memory 14) maintain knowledge of communications sessions not in the CLOSED state 201 of operation. In the CLOSED session state 201, any connection made between peer transport agents 107 may be deemed to be the first connection.

An OPEN session state 202 may refer to the state of operation of a communications session after the first connection is made from a transport agent of one peer to a transport agent of the other. If any errors occur while in the OPEN session state 202, the connection may be closed and the state of operation may revert to the CLOSED session state 201. In some examples, in the OPEN session state 202, a handshake transport message 103 may be sent by each peer using the transport agents 107 mutually connecting the peers.

Further in FIG. 2, a CONNECTING session state 203 refers to a state of operation of a communications session while there is a mutual network connection between a transport agent 107 of each peer and wherein a handshake transport message 103 has just been received by each transport agent 107 and accepted by the local peer.

After receiving a handshake transport message 103 from a remote peer, the local peer may examine the identity of the remote peer contained in the handshake transport message 103. If the first transport message 103 is not received by the local peer's transport agent 107 within a certain period of time after the first connection is made, or the first transport message 103 is not a handshake transport message 103, the connection may be closed and the state of operation may revert to the CLOSED session state 201.

If the handshake transport message 103 contains acceptable data, the method 200 may allocate the peer session state data (300 of FIG. 3) needed to store the present state of the communications session, associate the peer session state with the remote peer as determined by the identity of the remote peer contained in the received handshake transport message 103, and transition the state of operations of the communications session to the CONNECTING session state 203.

Provided that the storage component(s) (e.g. the memory 14) of the electronic devices 10 executing the method 200 maintain the peer session state data (300 of FIG. 3) and associate the identity of the remote peer, to be retrieved at some future time by each peer, the method 200 may record the state of operation of the communications session as not in the CLOSED session state 201. When a peer session state's data (300 of FIG. 3) or its association with the remote peer's identity is destroyed or lost (e.g., intentionally or otherwise), the method 200 may transition the state of operation of the communications session to the CLOSED session state 201.

If any errors occur while the method 200 is in the CONNECTING session state 203 of operation, the connection may be closed and the state of operation of the communications session may transition to the OFFLINE session state 205. If the remote peer's identity specified in the handshake transport message 103 is not acceptable to the local peer, then the local peer may send a handshake transport rejection message 103 to the remote peer via the transport agent 107, close the connection, and transition the state of operation of the communications session to the CLOSED session state 201.

If the remote peer's identity specified in the handshake transport message 103 is acceptable to the local peer, then the local peer may send a handshake acceptance transport message 103 to the remote peer via the transport agent 107 and wait to receive a handshake acceptance or a handshake rejection transport message 103 from the remote peer via the same transport agent 107. If a second transport message 103 is not received within a certain period of time, or the second transport message 103 is not a handshake acceptance or a handshake rejection transport message 103, the connection is closed and the state of operation of the communications session transitions to the OFFLINE session state 205.

Further in FIG. 2, if the local peer receives a handshake acceptance transport message 103, the state of operation of the communications session transitions to an ACTIVE session state 204. If however, the local peer receives a handshake rejection transport message 103, the method 200 closes the connection and the state of operation of the communications session is transitioned to the CLOSED session state 205.

In some examples, the ACTIVE session state 204 may refer to a state of operation of a communications session when there is a mutual network connection between a transport agent 107 of each peer and a handshake acceptance transport message 103 has been received by each transport agent 107. The local peer may associate the transport agent 107 involved in the mutual network connection with the identity of the remote peer. While the state of operation of the communications session remains in the ACTIVE session state 204, any application messages 101 submitted to the local peer for delivery to the remote peer may be sent via the associated transport agent 107.

If the connection between peer transport agents 107 is lost, closed, or otherwise enters an unrecoverable state while the communications session is in an ACTIVE session state 204 of operation, the local peer confirms that the connection is closed, disassociates the transport agent 107 from the identity of the remote peer and transitions the state of operations to the OFFLINE session state 205.

In some examples, while the state of operation of the communications session is in the OFFLINE session state 205 and the application 16 associated with the local peer is not currently submitting messages 101 for delivery to the remote peer, the local peer may choose to place the peer session state data (300 of FIG. 3) into storage component(s) (e.g., the memory 14). If the application 16 submits a new message 101 to be delivered to the remote peer, or the operational state enters the ACTIVE session state 204, the local peer may retrieve the peer session state data (300 of FIG. 3) associated with the identity of the remote peer from the storage component(s) (e.g., the memory 14).

If a mutual connection is made between a transport agent 107 of each peer while the communications session is in the OFFLINE session state 205 of operation, a handshake transport message 103 may be sent by each peer using the transport agents 107 mutually connecting the peers. If a handshake transport message 103 is not received by the local peer's transport agent 107 within a certain period of time, the connection may be closed and the state of operation of the communications session remains in the OFFLINE session state 205. As stated above, after each peer has received a handshake transport message 103, the communications session transitions to the CONNECTING session state 203 of operation.

These features permit the lifetime of the communications session to transcend the lifetime of the processes used to host applications 16 on the electronic devices 10. For example, if the state of operation between two peers is in the OFFLINE session state 205, then the peers may place the peer session data into storage (e.g., the memory 14) before the associated applications 16 are turned off or otherwise shut down. When the applications 16 are started again at some future time (including on a different electronic device 10) and the transport agents 107 mutually connect with one another to exchange additional handshake transport messages 103, the system and methods of the present application 16 may retrieve the peer session state data (300 from FIG. 3) from storage (e.g., the memory 14), and the state of operation of the communications session can be transitioned from the OFFLINE session state 205 to the CONNECTING session state 203.

In some examples, the method 200 may use peer session state data (300 of FIG. 3) to define how messages 101 submitted to a local peer from an application 16 become transport messages 103 that are sent via a peer's transport agent 107, as well as to define how transport messages 103 received from a peer's transport agent are released by the local peer to an application 16. Further, the method 200 may use the peer session state data (300 of FIG. 3) to ensure that all messages 101 submitted to a local peer for delivery to a remote peer will eventually be released to the remote peer in the correct order and without duplication for as long as the state of operation of the communications session is not in the CLOSED session state 201.

Figure 3:
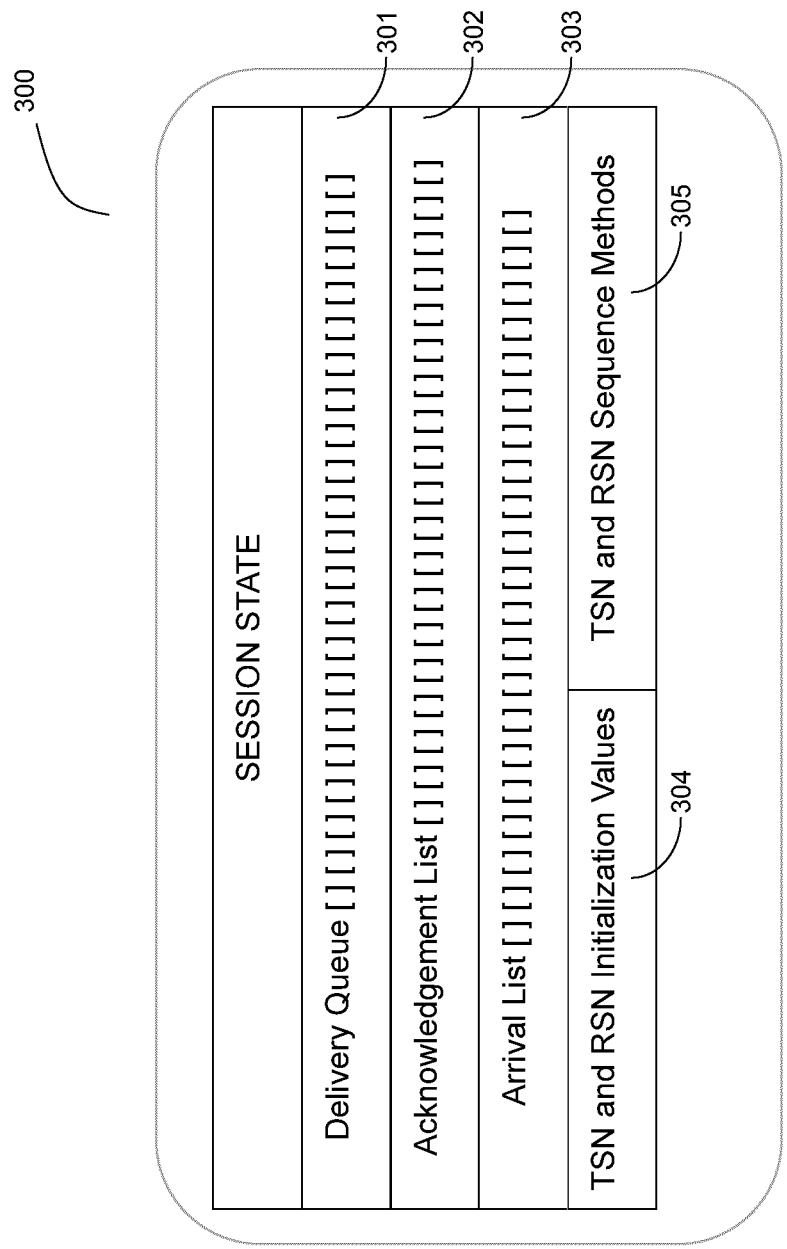
FIG. 3 is a table illustrating an exemplary reliable messaging components.

Referring to FIG. 3, a table illustrating exemplary reliable messaging components is shown. In one example, the table may include peer session state data 300. The peer session state data 300 may be stored, for example, in a storage medium (e.g., the memory 14) at both the sending peer and the receiving peer(s). Each peer may maintain one peer session state data 300 with respect to each remote peer that the local peer communicates with. In addition to storing the session state of a communications session with respect to a particular remote peer, the storage component(s) (e.g., the memory 14) of the local peer may maintain the peer session state data 300 including the following item(s): (a) initialization values 304; (b) sequence methods 305 for transmission sequence numbers ("TSN") and release sequence numbers ("RSN"); (c) a delivery queue 301 of transport messages 103, which may contain messages 101 submitted by an application to a local peer for delivery to the remote peer; (d) an acknowledgement list 302, which may include an ordered list of transport messages 103 (e.g., in order of TSN) that have been provided to a transport agent 107 for delivery to a remote peer via the transport agent 107, but may not yet have been acknowledged as being received by the remote peer; and (e) an arrival list 303, which may include an ordered list of transport messages 103 (e.g., in order of TSN) that have been received by the local peer from a remote peer but have not been released to the local receiving application (e.g. application 16).

Sequence methods 305 may also be referred to as numerical generation methods 305 or numerical sequence methods 305.

The TSN of a transport message 103 may represent the time and/or order that a message 101 is queued for transmission by a local peer to a remote peer and the RSN may represent the TSN of the last message 101 received by a local peer from a remote peer that was released to a receiving application 16. By comparing the TSN of a transport message 103 from a remote peer with the current RSN value at the local peer, the local peer can determine the order of a received transport message 103 as well as the existence of duplicate transport messages 103. For example, if the TSN of a transport message 103 generated by a remote peer at the head of the arrival list 303 matches the next RSN of the local peer for that particular remote peer, then a confirmation exists that this transport message 103 is the next transport message 103 in the reliable messaging system's delivery sequence to be released, and the transport message's 103 message 101 is released to the application.

The TSN and RSN data value(s) may be used to ensure correct ordering of messages 101 by the peer as it may not be necessary that messages be received by a peer from a transport agent 107 in the same order that they were originally sent by the remote peer. The TSN and RSN may be useful for identifying duplicate transport message 103 transmissions, as a local peer could potentially receive duplicates when a remote peer transitions to the ACTIVE session state 204, for example. The TSN and RSN values may be initialized to zero during a communications session, although in some examples, the first handshake transport message 103 received may contain a value that a remote peer may use to initialize its TSN. In this case, the local peer may initialize its RSN with the same value.

In some examples, the local and remote peers may use the same allowable range of values to represent each sequence number, and when the next value of a sequence is needed, the TSN and RSN sequence methods 305 may be applied to generate the next value from the current value. The local peer may generate the next value for its RSN using the same sequence method 305 that the remote peer used to generate the next value for its TSN. In one example, the sequence method 305 may be an algorithm. The minimum number of sequence values generated by the sequence method 305 before a sequence value is repeated may be greater than the total number of messages 101 that would be expected to be submitted to a local peer during the lifetime of the communications session (e.g., before the session state of operation transitions to the CLOSED session state 201).

In further examples, the remote peer may identify the numerical sequence method 305 that the remote peer is using to generate values for its TSN in the first handshake transport message 103 it sends to the local peer. For example, a numerical sequence method 305 may increment the value of the sequence number by one, except if the incremented value lies outside the allowable range, in which case the first value in the range is chosen as the new sequence number value. An error may be generated if the local peer does not recognize the numerical sequence method 305 specified by the remote peer.

In some examples, the arrival list 303 may store transport messages 103 in order, but with potential gaps, as it is not necessary that transport messages 103 be received by another peer from a transport agent 107 in the same order that they were originally sent by the other peer. If the TSN of the transport message 103 as generated by the remote peer at the head of the arrival list 303 of the receiving local peer matches the next RSN generated by the receiving local peer, then the receiving local peer identifies this transport message 103 as the next transport message 103 in the delivery sequence, and releases the transport message's 103 message 101 to the application.

If however, a transport message 103 arrives with a TSN that is equal to or less than the RSN generated by the receiving local peer, then the transport message 103 is identified as a duplicate. Also, if a transport message 103 arrives with a TSN matching the TSN of a transport message 103 already in the arrival list 303, then this transport message 103 may be identified as a duplicate.

In use, when an application submits a message 101 to a local peer for delivery to a remote peer, the local peer may retrieve from storage component(s) (e.g., the memory 14) of the local peer the peer session state data 300 associated with the remote peer. If the peer session state data 300 cannot be retrieved, the system may identify the communications session as being in the CLOSED session state 201, and an error may be raised with the application, for example.

Once the peer session state data 300 has been retrieved, the local peer may create a new transport message 103 containing the message 101 to be sent, and place the transport message 101 at the tail of the delivery queue 301 of the peer session state data 300. The identity of the local peer sending the transport message 103 may be placed in the message header 102 of the new transport message 103.

To send transport messages from the local peer to the remote peer during the ACTIVE session state 204 of operation of the communications session, the local peer may wait for a transport message 103 to become available at the head of the delivery queue 301 of the peer session state data 300 associated with the remote peer. If not already done, the local peer may then update the value of the TSN of the peer session state to the next value according to the local peer's TSN sequence method 305 and place the updated value in the message header 102 of the transport message 103.

The local peer can then place the current value of the RSN of the peer session state data 300 in the transport message's message header 102.

To transmit the message 101, the local peer may send a copy of the transport message 103 via the transport agent 107 associated with the remote peer.

The local peer may move the transport message from the head of the delivery queue 301 to the end of the acknowledgment list 302 in the peer session state data 300.

To receive transport messages 103 from a remote peer, during the ACTIVE session state 204 of operation of the communications session, a local peer may wait for a transport message 103 to be received from any transport agent 107. The local peer may retrieve the remote peer's identity from the message header 102 in the transport message 103. The local peer may retrieve the peer session state data 300 associated with the remote peer. If the peer session state data 300 cannot be retrieved, the local peer discards the transport message 103 and awaits receipt of a new transport message 103.

If the peer session state data 300 is retrieved, the local peer may identify the RSN and TSNs contained in a transport message's 103 message header 102. Any and all transport messages 103 in the acknowledgement list 302 that contain a TSN in their respective message headers 102 that is equal to or comes before the RSN contained in the newly received transport message's 103 message header 102, according to the remote peer's TSN sequence method 305, may be removed from the acknowledgement list 302 and discarded. If the TSN is equal to or comes before the current RSN of the peer session state data 300, according to the TSN sequence method 305 being used by the remote peer, the local peer discards the transport message 103 as a duplicate.

If the TSN comes after the current RSN of the peer session state data 300, according to the TSN sequence method 305 being used by the remove peer, the local peer may place the newly received transport message 103 into the arrival list 303 such that the arrival list 303 is maintained in sorted order wherein the transport message 103 at the end of the arrival list 303 has a message header 102 containing the most recent TSN according to the remote peer's TSN sequence method 305, the penultimate transport message 103 in the arrival list 303 has a message header 102 containing the second most recent TSN, and so on such that the transport message 103 at the start of the arrival list 303 has a message header 102 containing the least recent TSN.

Figure 4:
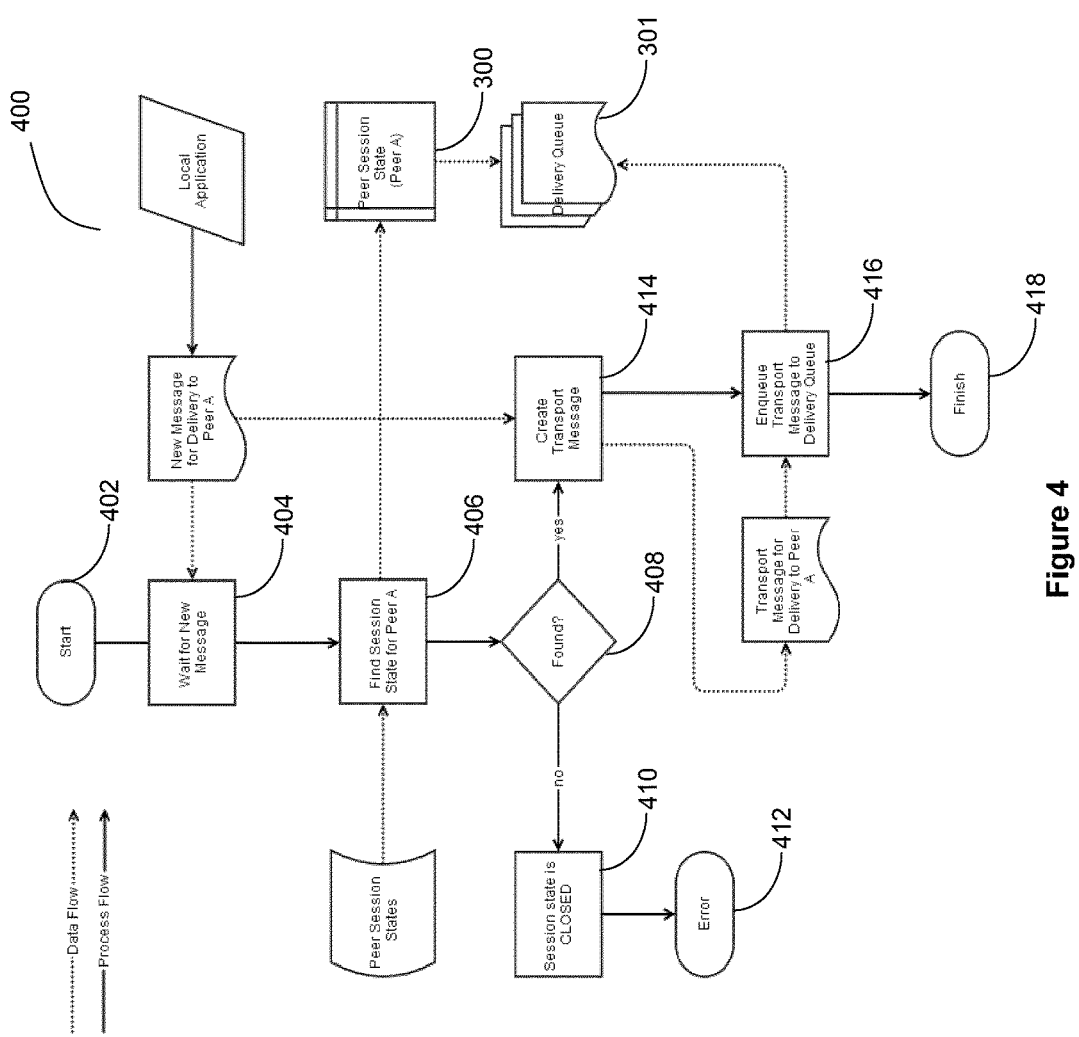
FIG. 4 is a flow chart illustrating a method for submitting messages from an application to a local peer.

Referring to FIG. 4, a flowchart is shown illustrating a method 400 of submitting messages to a local peer (e.g., an electronic device 10) from an application (e.g., the application 16). In one example, the method 400 can be implemented on an electronic device 10 having a processor 12, an optional display 22 coupled to the processor 12, a memory 14 coupled to the processor 12, and having the application 16 and communications module 18 saved in the memory 14. In one example, the application 16 and/or the communications module 18 executing on the processor 12 may perform the blocks of the method 400.

For any state of operation of the communications session except the CLOSED session state 201, an application (e.g., the application 16) may submit a message (e.g., the message 101) to the local peer (e.g., the electronic device 10) on which the application (e.g., the application 16) operates for delivery to a remote peer (e.g., a remote electronic device 10). The method 400 begins at a block 402. At a block 404, an application (e.g., the application 16) may submit a message 101 to the local peer for delivery to a remote peer, as indicated by "waiting for new message" at the block 404, where the local peer waits for and accepts a new message 101 from the application (e.g., the application 16). Next, at a block 406, the local peer obtains the peer session state data 300 associated with the remote peer, for example by loading the peer session state data 300 from a memory (e.g., the memory 14) of the local peer. The method 400 may determine at a block 408 if the peer session state data 300 associated with the remote peer has been obtained. If the peer session state data 300 cannot be obtained, then the communications session may be considered to be in the CLOSED session state 201 (block 410), and the local peer may report an error (block 412) to the application (e.g., the application 16). When the peer session state data 300 is obtained and the communication session is not in the CLOSED session state 201, the local peer may create a new transport message 103 at block 414 containing the message 101 and place the transport message 103 at the tail of the delivery queue 301 of the peer session state data 300 at block 416. The identity of the local peer is placed in the message header 102 of the new transport message 103. The method 400 may complete at block 418.

Figure 5:
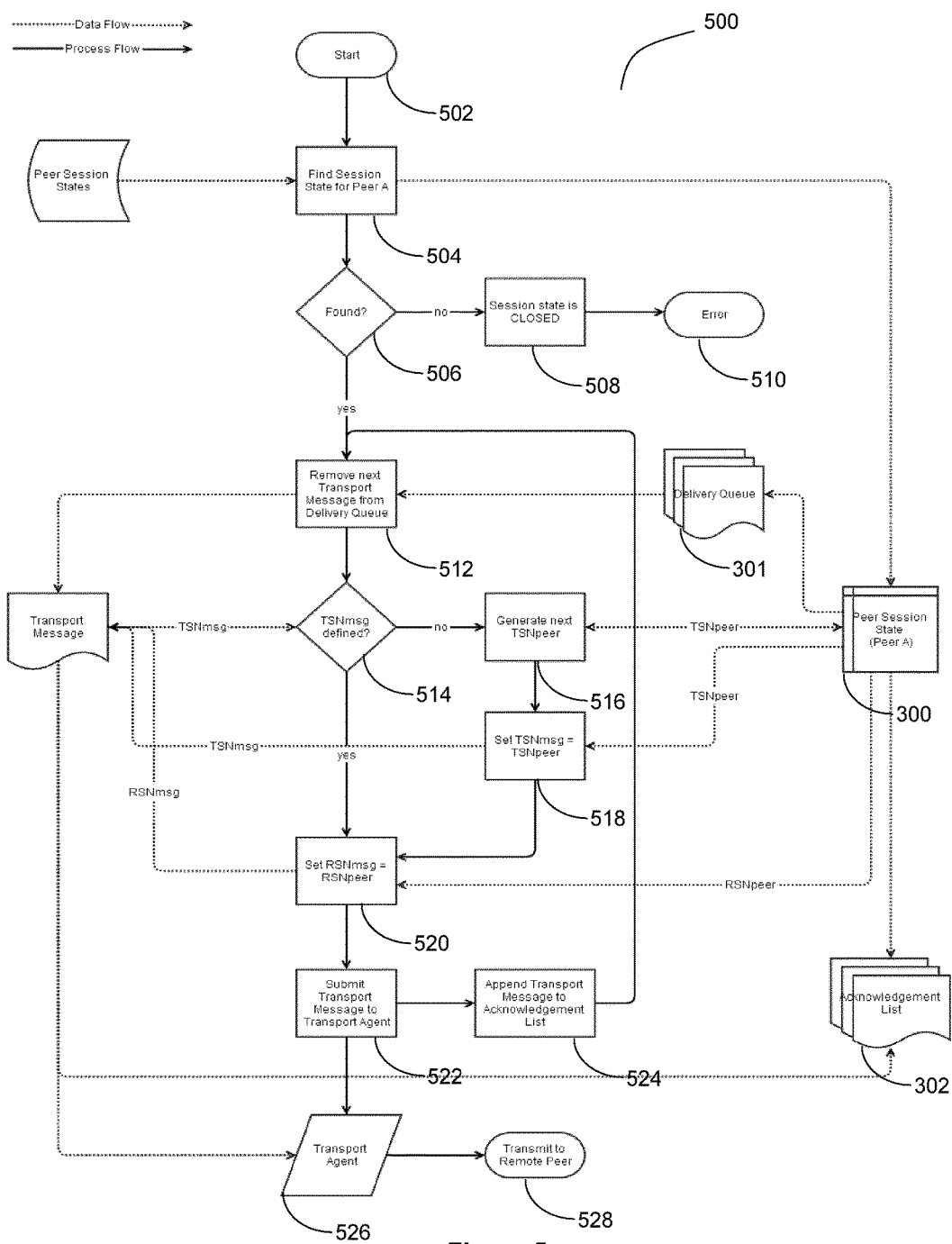
FIG. 5 is a flow chart illustrating a method of sending transport messages from a local peer to a remote peer.

Referring to FIG. 5, a flowchart is shown illustrating a method 500 of sending transport messages 103 from the local peer (e.g., the electronic device 10) to the remote peer (e.g., a remote electronic device 10). In one example, the method 500 can be implemented on a device 10 having a processor 12, an optional display 22 coupled to the processor 12, a memory 14 coupled to the processor 12, and having the application 16 and communications module 18 saved in the memory 14. In one example, the application 16 and/or the communications module 18 executing on the processor 12 may perform the blocks of the method 500.

The method 500 begins at a block 502. When a communications session is in the ACTIVE session state 204, the method 500 may be performed. Therefore, the method 500 may first retrieve from memory (e.g., the memory 14 of the local peer) at a block 504 the peer session state data 300 of the communications session with the remote peer of interest. The method 500 may check at a block 506 if the peer session state data 300 has been retrieved or found at the block 504. If the peer session state data 300 is unknown or if the peer session state data 300 indicates the communications session is in the closed session state 201 (block 508), the method 500 may report an error (block 510), for example to the application (e.g. application 16) awaiting delivery of the transport message 103 to a remote peer.

When the peer session state data 300 is found and the communication session is in the ACTIVE session state 204, the local peer waits for a transport message 103 to become available at the head of the delivery queue 301 of the peer session state data 300 associated with the remote peer and the next transport message 103 is removed from the delivery queue 301 at a block 512. The method 500 then determines if the transport message's message header 102 contains a TSN at a block 514. If the transport message's 103 message header 102 does not already contain a TSN, then the local peer generates the value of the TSN of the peer session state 300 to the next value (block 516) according to the local peer's TSN numerical sequence method 305 and places the updated value of the TSN in the message header 102 of the transport message 103 (e.g., set TSNmsg=TSNpeer at a block 518). The local peer may move the transport message 103 from the head of the delivery queue 301 to the end of the acknowledgment list 302 in the peer session state data 300. The local peer next places the current value of the RSN of the peer session state data 300 in the transport message's 103 message header 102 (block 520), replacing any existing RSN value previously stored there so that upon receipt the remote peer can determine which transport messages 103 sent by the remote peer to the local peer have been successfully received and released to the local application by the local peer. Next, at block 522, the local peer submits a copy of the transport message 103 to the transport agent 107 associated with the remote peer. The transport message 103 is then appended to the acknowledgement list (block 524). The local peer returns to block 512 to prepare to send any further transport messages 103 waiting in the delivery queue 301. The transport agent 107 sends transport messages 103 from the local peer to the remote peer (blocks 526, 528).

Figure 6:
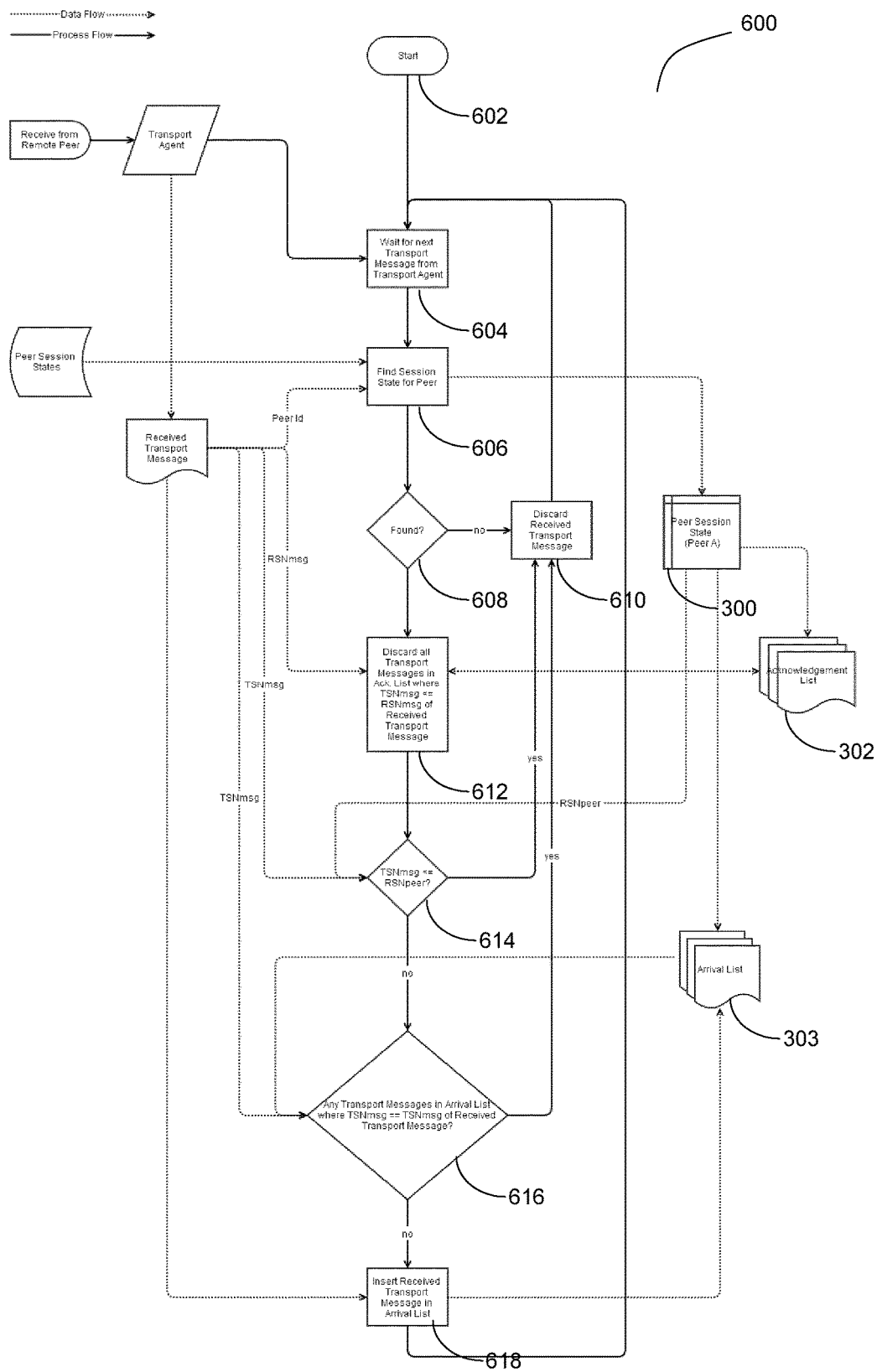
FIG. 6 is a flow chart illustrating a method of receiving transport messages at a local peer from a remote peer.

Referring to FIG. 6, a flowchart is shown illustrating a method 600 of receiving transport messages 103 at the local peer (e.g., a electronic device 10) from a remote peer (e.g., a remote electronic device 10). In one example, the method 600 can be implemented on a device 10 having a processor 12, an optional display 22 coupled to the processor 12, a memory 14 coupled to the processor 12, and having the application 16 and communications module 18 saved in the memory 14. In one example, the application 16 and/or the communications module 18 executing on the processor 12 may perform the blocks of the method 600.

During the ACTIVE session state 204 of the communications session, the method 600 may perform the operations shown in FIG. 6 for receiving transport messages 103 at a local peer from a remote peer. The method 600 begins at a block 602. At a block 604, the local peer waits for a transport message 103 to be received from any transport agent 107. When a transport message 103 arrives, the local peer obtains the remote peer's identity (e.g., peer ID) from the message header 102 in the transport message 103. The local peer next obtains the peer session state data 300 associated with the remote peer at a block 606, for example from the memory (e.g., the memory 14) of the local peer. The local peer evaluates the peer session state data 300 at a block 608. If the peer session state data 300 for the remote peer that sent the transport message 103 could not be obtained, the local peer discards the transport message 103 at a block 610 and returns to the block 604. When the peer session state data 300 for the remote peer that sent the transport message 103 is obtained, the local peer retrieves the RSN contained in the transport message 103 message header 102 and removes every transport message 103 from the acknowledgment list 302 of the peer session state data 300 that contains a TSN in its message header 102 that is equal to or comes before the RSN according to the TSN numerical sequence method 305 being used by the local peer (block 612).

Next at a block 614, the local peer retrieves the TSN contained in the transport message's 103 message header 102 and compares the TSN to the current RSN of the peer session data 300. If the TSN is equal to or comes before the current RSN of the peer session state 300, according to the TSN numerical sequence method 305 being used by the remote peer, the local peer discards the transport message 103 as a duplicate at the block 610 and returns to the block 604. Next, the method 600 evaluates whether the TSN contained in the message header 102 of the transport message 103 is contained in the arrival list 303 of the peer session state data 300 at a block 616. If the TSN contained in the message headers 102 of the transport message 103 is contained in the arrival list 303 of the peer session state data 300, the local peer discards the transport message 103 as a duplicate at the block 610 and returns to the block 604. When the TSN contained in the message header 102 of the transport message 103 is not contained in the message headers 102 of any transport message 103 in the arrival list 303 of the peer session state data 300, the local peer places the transport message 103 into the arrival list 303 of the peer session state data 300 at a block 618. The method 600 then returns to the block 604.

When placing the transport message 103 into the arrival list 303 of the peer session state data 300 at the block 618, the arrival list 303 may be maintained in a sorted order such that the transport message 103 at the end of the arrival list 303 has message headers containing the most recent TSN according to the remote peer's TSN numerical sequence method 305. The penultimate transport message 103 in the arrival list 303 has a message header 102 containing the second most recent TSN, and so on such that the transport message 103 at start of the arrival list 303 has message header 102 containing the least recent TSN.

Figure 7:
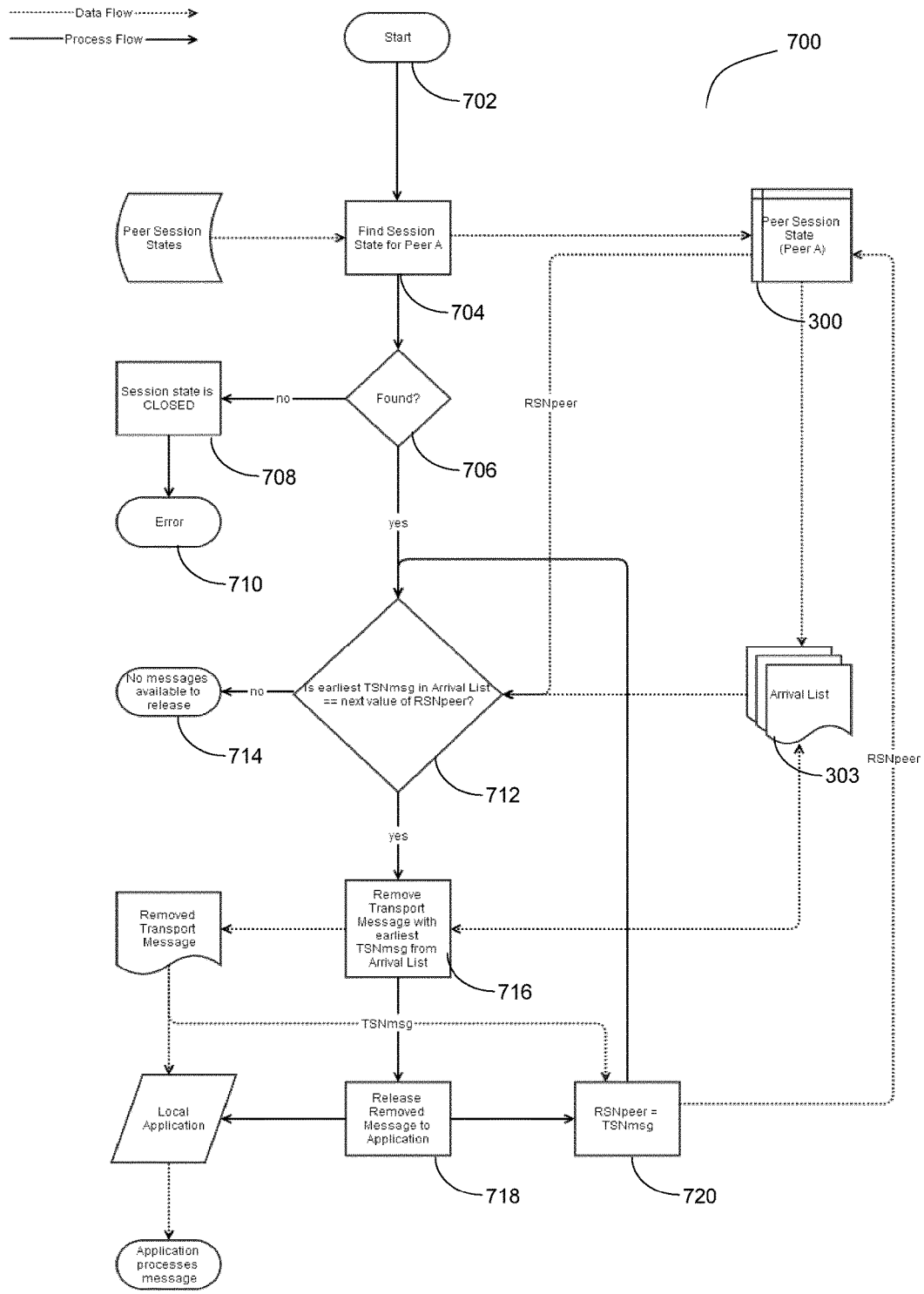
FIG. 7 is a flow chart illustrating a method for releasing messages to the application from the local peer.

Referring to FIG. 7, a flow chart is shown illustrating a method 700 for releasing messages 101 to the application (e.g., the application 16) from the local peer (e.g., the device 10). In one example, the method 700 can be implemented on a device 10 having a processor 12, an optional display 22 coupled to the processor 12, a memory 14 coupled to the processor 12, and having the application 16 and communications module 18 saved in the memory 14. In one example, the application 16 and/or the communications module 18 executing on the processor 12 may perform the blocks of the method 700.

The method 700 begins at a block 702. During any state of operation of the communications session except the CLOSED session state 201 and the OPEN session state 202, the local peer may obtain the peer session state data 300 associated with a particular remote peer at a block 704, for example by loading the peer session state data 300 from the memory (e.g., the memory 14) of the local peer. At a block 706, it is determined if the peer session state data 300 was loaded and/or the communications session is in the CLOSED session state 201. When the peer session state data 300 could not be loaded and/or the communications session is in the CLOSED session state 201, the communications session is considered to be in the CLOSED session state 201 (block 708) and the method 700 returns an error at block 710 (e.g., the error may be returned to the application 16). When the peer session state data 300 is successfully loaded and the communications session is not in the CLOSED session state 201, the method 700 proceeds to the block 712.

At a block 712, the method 700 determines if the TSN contained in the message header 102 of the transport message 103 at the start of the arrival list 303 of the peer session state data 300 is equal to the next value of the RSN of the peer session state data 300 according to the RSN sequence method 305. When the TSN contained in the message header 102 of the transport message 103 at the start of the arrival list 303 of the peer session state data 300 is not equal to the next value of the RSN of the peer session state data 300, the method 700 determines that no messages are available to be released to the application (block 714). When the TSN contained in the message headers 102 of the transport message 103 at the start of the arrival list 303 of the peer session state data 300 is equal to the next value of the RSN of the peer session state data 300, the method 700 proceeds to a block 716.

In one example, the arrival list may not be handled in a FIFO manner. At a block 716, the local peer removes the transport message 103 with the earliest TSN from the start of the arrival list 303. The local peer obtains the message 101 from the transport message 103, and if the message 101 is not a ping message 101 or an acknowledgment message 101, the local peer releases the message 101 to its associated application (e.g. application 16) at a block 718. The local peer next updates the value of the RSN of the peer session state data 300 to the next value according to the remote peer's TSN sequence method 305 at a block 720. When the message 101 is not an acknowledgment message 101 and the delivery queue 301 of the peer session state 300 is empty, then the local peer submits a new acknowledgment message 101 for delivery to the remote peer.

In some examples, unacknowledged transport messages 103 may be retransmitted. When entering the ACTIVE session state 204 for a communications session, any transport messages 103 in the acknowledgment list 302 of the peer session state 300 associated with the remote peer may not have been received by the remote peer's transport agent before the state of operation of the communications session transitioned from the ACTIVE session state 204 to the OFFLINE session state 205. Before the state of operation returns to the ACTIVE session state 204, the transport messages 103 in the acknowledgment list 302 may to be moved to the head of the delivery queue 301 for retransmission to the remote peer's transport agent.

Thus, as the state of operation of the communications session transitions from the CONNECTING session state 203 to the ACTIVE session state 204, the local peer may sequentially move transport messages 103 from the end of the acknowledgment list 302 to the head of the delivery queue 301 of the peer session state 300 associated with the remote peer. At the end of this procedure, the acknowledgment list 302 may be empty and the new head of the delivery queue 301 may have been the start of the acknowledgment list 302.

In some examples, the present application may provide for early detection of connection failures. In some cases the network protocol used by transport agents 107 may not report failure of a network connection when there is no data being exchanged over the protocol. It may be the case that the applications (e.g. the applications 16) associated with the peers in a communications session in the ACTIVE session state 204 have no need to submit messages 101 for delivery to each other for some period of time. In order to facilitate the detection of failure of a network connection such that the communications session may transition to the OFFLINE session state 205, a local peer may periodically submit ping messages 101 to the remote peer. While a communications session is in the ACTIVE session state 204, the local peer may wait for some pre-determined period of time to elapse. If there are no transport messages 103 in the delivery queue 301 of the peer session state data 300 associated with the remote peer's identity, the local peer may submit a ping message 101 for delivery to the remote peer, thus triggering an attempt at data exchange over the network protocol used by the transport agents 107 and exposing any latent failure of the network connection.

The present application provides features that aim to improve communications. Conventional communications software for exchanging messages between applications does not contemplate placing a number like the TSN of the last RELEASED message (e.g., equal to the RSN when it is released) in the next outbound message. Conventional approaches may place the a number like the sequence number of the last RECEIVED message in the next outbound message, which may cause conventional systems to behave incorrectly when messages do not arrive in order. For example, if peer A has received messages 1 and 3 from peer B, and has sent a message to peer B with the value 3 as the last received sequence number, then peer B may remove messages 1, 2, & 3 from its outbound queue, even though message 2 has not yet arrived at Peer A. If the connection between A and B is terminated before message 2 arrives (e.g., out of order) at peer A, then when the peers are reconnected, peer B may never resend message 2 to peer A. This problem with conventional methods limits the implementations of conventional approaches to using network "service" protocols which guarantee in order delivery of every byte transmitted from one peer to the other; this includes TCP and other protocols built on top of TCP, such as HTTP/HTTPS. The methods in the present application can be deployed more readily on a much larger range of network protocols, including UDP, which do not guarantee delivery of all messages in order. This may be advantageous because protocols like UDP typically operate with lower time and space overhead on the network than TCP does, resulting in more efficient use of the network and quicker delivery of information between peers.

In some examples, the present application may provide increased security over conventional methods. In some examples, the sequence methods 305 may only be known to the peers 106, which may make the methods of the present application less susceptible to man-in-the-middle attacks where the man-in-the-middle could insert a spoofed message to a peer based on knowing the next sequence number expected at that peer, which would cause the next message sent from the real peer to be discarded as a duplicate.

At least some of the elements of the systems described herein may be implemented by software, or a combination of software and hardware. Elements of the system that are implemented via software may be written in a high-level procedural language such as object oriented programming or a scripting language. Accordingly, the program code may be written in C, C++, Javascript, or any other suitable programming language and may comprise modules or classes, as is known to those skilled in object oriented programming. At least some of the elements of the system that are implemented via software may be written in assembly language, machine language or firmware as needed. In either case, the program code can be stored on storage media or on a computer readable medium that is readable by a general or special purpose programmable computing device having a processor, an operating system and the associated hardware and software that is necessary to implement the functionality of at least one of the embodiments described herein. The program code, when read by the computing device, configures the computing device to operate in a new, specific and predefined manner in order to perform at least one of the methods described herein.

Furthermore, at least some of the methods described herein are capable of being distributed in a computer program product comprising a non-transitory computer readable medium that bears computer usable instructions for execution by one or more processors, to perform aspects of the methods described. The medium may be provided in various forms such as, but not limited to, one or more diskettes, compact disks, DVDs, tapes, chips, USB keys, external hard drives, wire-line transmissions, satellite transmissions, internet transmissions or downloads, magnetic and electronic storage media, digital and analog signals, and the like. The computer useable instructions may also be in various forms, including compiled and non-compiled code.

While the teachings described herein are in conjunction with various embodiments for illustrative purposes, it is not intended that the teachings be limited to such embodiments. On the contrary, the teachings described and illustrated herein encompass various alternatives, modifications, and equivalents, without departing from the described embodiments, the general scope of which is defined in the appended claims. Except to the extent necessary or inherent in the processes themselves, no particular order to steps or stages of methods or processes described in this disclosure is intended or implied. In many cases the order of process steps may be varied without changing the purpose, effect, or import of the methods described.

What is claimed is:

1. An electronic device comprising:
a processor;
a memory coupled to the processor; and
a communications module saved in the memory and an application saved in the memory, the communications module for configuring the processor to:
generate, for each outgoing transport message to be sent to a remote device a respective transmission sequence number, wherein the transmission sequence number for each outgoing transport message is generated using a non-consecutive numerical generation method that is known only between the electronic device and the remote device;
include the respective transmission sequence number for each outgoing transport message in the outgoing transport message;
send the outgoing transport messages to the remote device through a network; and
receive release sequence numbers from the remote device through the network that identify the outgoing transport messages received by the remote device,
wherein the transmission sequence numbers and release sequence numbers are stored in the memory and used to coordinate a reliable communications session between the electronic device and the remote device such that the reliable communications session persists independent of states of underlying communications protocols, including when a network address of at least one of the electronic device and the remote device changes during the reliable communications session.

2. The electronic device according to claim 1, wherein the communications module further configures the processor to:
generate, using the non-consecutive numerical generation method, an expected incoming release sequence number for a next expected incoming transport message to be received from the remote device;
receive an incoming transport message from the remote device, the incoming transport message including a respective transmission sequence number; and
release data contained in the incoming transport message to the application when the expected incoming release sequence number corresponds to the respective transmission sequence number included in the incoming transport message.

3. The electronic device of claim 2 wherein the communications module further configures the processor to determine that the respective transmission sequence number is a duplicate of a previous release sequence number generated using the non-consecutive numerical generation method, and discard the incoming transport message.

4. The electronic device according to claim 1, wherein information identifying the numerical generation method is shared only between the electronic device and the remote device.

5. The electronic device according to claim 1, wherein the communications module further configures the processor to:
maintain in the memory a delivery queue of the outgoing transport messages to be sent to the remote device; and
maintain in the memory an acknowledgement list of outgoing transport messages already sent to the remote device, the outgoing transport messages of the acknowledgement list being removed from the acknowledgement list when respective transmission sequence numbers of the transport messages of the acknowledgement list are matched with respective release sequence numbers received from the remote device.

6. The electronic device of claim 1 wherein the communications module configures the processor to:
continue the reliable communications session, when the network address of at least one of the electronic device and the remote device changes, by retrieving from the memory the stored transmission sequence numbers and release sequence numbers.

7. The electronic device of claim 1 wherein the communications module is configured to maintain the reliable communications session though different communications states including through a first state transition from a connected state in which the electronic device and the remote device exchange messages through the network using a communications protocol to an off-line state in which an exchange of messages between the electronic device and the remote device is suspended and a second state transition from the off-line state to a subsequent connected state in which the electronic device and the remote device resume exchanging messages.

8. The electronic device of claim 1 wherein the non-consecutive numerical generation method is configured to generate a total number of sequence numbers that is greater than a total number of messages expected to be sent to the remote device.

9. A method for reliable communications between an electronic device and a remote device, the method comprising at the electronic device:
generating, for each of a plurality of outgoing transport messages to be sent to the remote device a respective transmission sequence number, wherein the transmission sequence number for each outgoing transport message is generated using a non-consecutive numerical generation method that is known only between the electronic device and the remote device;
including the respective transmission sequence numbers in the outgoing transport messages;
sending the outgoing transport message to the remote device; and
receiving from the remote device release sequence numbers that identify the outgoing transport messages received by the remote device,
wherein the transmission sequence numbers and release sequence numbers are stored in a memory and used to coordinate a reliable communications session between the electronic device and the remote device such that the reliable communications session persists independent of states of underlying communications protocols, including when a network address of at least one of the electronic device and the remote device changes during the reliable communications session.

10. The method according to claim 9 further comprising at the electronic device:
receiving an incoming transport message from the remote device, the incoming transport message including an incoming transmission sequence number;
generating, using the non-consecutive numerical generation method, an expected incoming release sequence number of a next expected transport message to be received from the remote device; and
releasing data contained in the incoming transport message to an application on the electronic device when the expected incoming release sequence number corresponds to the incoming transmission sequence number.

11. The method of claim 10 further comprising determining that the respective transmission sequence number is a duplicate of a previous release sequence number generated using the non-consecutive numerical generation method, and discarding the incoming transport message.

12. The method according to claim 9, wherein information identifying the numerical generation method is shared only between the electronic device and the remote device.

13. The method according to claim 9 further comprising at the electronic device:
maintaining in the memory a delivery queue of the outgoing transport messages to be sent to the remote device; and
maintaining in the memory an acknowledgement list of outgoing transport messages already sent to the remote device, the outgoing transport messages of the acknowledgement list being removed from the acknowledgement list when respective transmission sequence numbers of the transport messages of the acknowledgement list are matched with respective release sequence numbers received from the remote device.

14. The method of claim 9 wherein the non-consecutive numerical generation method is configured to generate a total number of sequence numbers that is greater than a total number of messages expected to be sent to the remote device.

15. A system for reliable communications comprising:
an electronic device having a processor;
a memory coupled to the processor;
a communications module saved in the memory and an application saved in the memory, the communications module for configuring the processor to:
generate a first transmission sequence number associated with a transport message to be sent to a remote device, the first transmission sequence number being generated using a non-consecutive numerical generation method that is known only between the communications module and the remote device;
include the first transmission sequence number in the transport message;
send the transport message to the remote device; and
add the transport message to an acknowledgement list;
the remote device having a processor; a memory coupled to the processor; a communications module saved in the memory and an application saved in the memory, the communications module of the remote device for configuring the processor to:
receive the transport message from the electronic device;
generate a first release sequence number of a next expected transport message to be received from the electronic device, the first release sequence number being generated using the non-consecutive numerical generation method; and release data contained in the transport message to the application of the remote device when the first release sequence number equals the first transmission sequence number, wherein the first transmission sequence number and the first release sequence number are used to coordinate a reliable communications session between the electronic device and the remote device such that the reliable communications session persists independent of states of underlying communications protocols, including when a network address of at least one of the electronic device and the remote device changes during the reliable communications session.

16. The system according to claim 15, the communications module of the remote device further configuring the processor to:

generate, using the non-consecutive numerical generation method, a second transmission sequence number associated with a second transport message to be sent to the electronic device;

include the second transmission sequence number and the release sequence number in the second transport message, the release sequence number indicating the transmission sequence number of the last transport message for which data was released to the application;

send the second transport message to the electronic device; and add the second transport message to an acknowledgement list at the remote device;

the communications module of the electronic device further configuring the processor to:

receive the second transport message from the remote device;

generate, using the non-consecutive numerical generation method, a second release sequence number of a next expected transport message to be received from the remote device;

release data contained in the second transport message to the application of the electronic device when the second release sequence number equals the second transmission sequence number; and remove the first transport message from the acknowledgement list at the electronic device when the first release sequence number is equal to the first transmission sequence number of the first transport message.

17. The system of claim 16 wherein the communications module of the remote device further configures the processor to determine that the respective transmission sequence number is a duplicate of a previous release sequence number generated using the non-consecutive numerical generation method, and discard the incoming transport message.

18. The system according to claim 15, wherein the communications module of the electronic device and the communications module of the receiving device each further configure the respective processors to:

maintain in the memory a delivery queue of further transport messages to be sent, each of the further transport messages to include respective further transmission sequence numbers; and maintain in the memory the acknowledgement list of transport messages already sent, the transport messages of the acknowledgement list being removed from the acknowledgement list when respective transmission sequence numbers of the transport messages of the acknowledgement list are matched with respective release sequence numbers received in a transport message.

19. The system of claim 15 wherein the non-consecutive numerical generation method is configured to generate a total number of sequence numbers that is greater than a total number of messages expected to be sent to the remote device.

* * * * *